United States Patent
Fudala et al.

(10) Patent No.: US 10,215,511 B2
(45) Date of Patent: Feb. 26, 2019

(54) RECEIVER FOR A HEAT EXCHANGER AND HEAT EXCHANGER, ESPECIALLY CONDENSER, EQUIPPED THEREOF

(71) Applicant: Valeo Autosystemy sp. z o.o., Skawina (PL)

(72) Inventors: Andrzej Fudala, Przeworsk (PL); Dawid Szostek, Kraków (PL); Grzegorz Romanski, Kraków (PL)

(73) Assignee: Valeo Autosystemy Sp. z o.o., Skawina (PL)

( * ) Notice: Subject to any disclaimer, the term of this patent is extended or adjusted under 35 U.S.C. 154(b) by 149 days.

(21) Appl. No.: 14/748,677

(22) Filed: Jun. 24, 2015

(65) Prior Publication Data

US 2015/0377565 A1 Dec. 31, 2015

(30) Foreign Application Priority Data

Jun. 25, 2014 (EP) .................................... 14461545

(51) Int. Cl.
*F28F 9/22* (2006.01)
*F28F 9/007* (2006.01)
(Continued)

(52) U.S. Cl.
CPC ................ *F28F 9/22* (2013.01); *B01D 35/02* (2013.01); *F28F 9/007* (2013.01); *F28F 9/0246* (2013.01);
(Continued)

(58) Field of Classification Search
CPC .......................... F25B 39/04; F25B 2400/162; F25B 2400/16; F25B 2339/0442;
(Continued)

(56) References Cited

U.S. PATENT DOCUMENTS 5,974,828 A * 11/1999 Guerand ................. F25B 39/04
62/507
6,000,465 A * 12/1999 Kawahara ............... F25B 39/04
165/110
(Continued)

FOREIGN PATENT DOCUMENTS

DE 102007020708 A1 * 11/2008 ............ F25B 43/003
JP 09222267 A * 8/1997
JP 11270927 A * 10/1999 .............. F25B 39/04

OTHER PUBLICATIONS

DE-102007020708 A1—Machine English Translation.pdf.*
JP09222267A—English machine translation.*
JP11270927A—English machine translation.*

*Primary Examiner* — Orlando E Aviles Bosques
*Assistant Examiner* — Jose O Class-Quinones
(74) *Attorney, Agent, or Firm* — Osha Liang LLP

(57) ABSTRACT

A receiver for a heat exchanger, especially a condenser of a refrigerant system, is disclosed. The receiver has a hollow body and a closure closing the body. The body defines an internal volume configured to receive a fluid flowing through the heat exchanger, and the closure is adapted to establish a communication of the fluid between said internal volume and a flange of the heat exchanger. The closure is removable from the flange and detachably coupled to the body. A heat exchanger, especially a condenser equipped thereof, is also disclosed.

13 Claims, 3 Drawing Sheets

(51) Int. Cl.
   *F28F 9/02* (2006.01)
   *B01D 35/02* (2006.01)
   *F25B 39/04* (2006.01)

(52) U.S. Cl.
   CPC ....... *F25B 39/04* (2013.01); *F25B 2339/0442* (2013.01); *F25B 2400/162* (2013.01); *F28F 2280/02* (2013.01)

(58) Field of Classification Search
   CPC ........ F25B 2339/044; F25B 2339/0441; F25B 2339/0446; F28F 9/0253; F28F 9/22; F28F 9/0246; F28F 9/007; F28F 2280/02
   See application file for complete search history.

(56) References Cited

U.S. PATENT DOCUMENTS

| | | | | |
|---|---|---|---|---|
| 6,158,503 | A * | 12/2000 | Gille | B60H 1/3227 165/132 |
| 6,209,349 | B1 * | 4/2001 | Hu | B60H 1/3229 165/110 |
| 6,223,556 | B1 * | 5/2001 | De Keuster | F25B 39/04 165/132 |
| 6,679,319 | B1 * | 1/2004 | Kato | F25B 39/04 165/132 |
| 7,264,043 | B2 * | 9/2007 | Alinovi | F25B 39/04 165/110 |
| 2008/0314252 | A1 * | 12/2008 | Min | F25B 43/003 96/151 |
| 2012/0060546 | A1 * | 3/2012 | Armsden | F25B 43/006 62/474 |
| 2013/0152625 | A1 * | 6/2013 | Lee, III | F25B 43/00 62/474 |

\* cited by examiner

RECEIVER FOR A HEAT EXCHANGER AND HEAT EXCHANGER, ESPECIALLY CONDENSER, EQUIPPED THEREOF

BACKGROUND

The present invention relates to a receiver for a heat exchanger and a heat exchanger, especially a condenser, equipped thereof.

Condensers are devices that condense into liquid, a high-temperature and high-pressure refrigerant gas discharged from a compressor, by dissipating the heat of the refrigerant gas to a cooling fluid, the air for instance, or water according another embodiment not represented.

It is known condensers comprising a core made of headers and parallel tubes constituting a path to drive the refrigerant fluid which flows into the tubes. The tubes are spaced to allow the circulation of coolant between them, and then the heat exchange. A condenser may be divided into passes, made of several tubes, the fluid flowing successively from one pass to the other in serpentine way thanks to baffles located in the headers. In normal way, refrigerant flows from top to bottom and the last pass is located on the condenser bottom. The last pass can be, for instance, a subcooling pass for the refrigerant.

It is also known to integrate a receiver in the condenser. The receiver has several functions among which to constitute a reserve of refrigerant fluid. It is generally located on a side of the heat exchanger core along one of its headers. It collects the refrigerant fluid coming from the condensing part of the core and distributes it back to the core in the subcooling pass.

Several solutions to attach the receiver to the core and to establish a communication for the refrigerant fluid there between are known.

According to a first solution, the receiver is attached to the core by brackets and the condenser comprises hoses between the receiver and the header it is attached to. Thanks to such solution the receiver can be positioned according to a great variety of packaging constraints. Nevertheless, it requires many assembling operations leading to long cycle times and high costs.

According to a second solution, the receiver can be brazed to the header together with the condenser core. The assembling costs are hence decreased but such solution generates other difficulties linked to brazing complexity.

According to a third solution, the header is provided with a socket or flange which is brazed thereto and the receiver is attached to such flange. The flange further integrates channels establishing a communication between the core and the receiver for the fluid refrigerant. Such solution is an interesting compromise between the first and second solutions presented above.

Nevertheless, the receivers proposed today in that view remains rather heavy, especially as regards the bottom part of the receiver which is used to attach it to the flange.

SUMMARY OF DISCLOSURE

The invention aims to overcome such drawbacks and proposes a receiver for a heat exchanger, especially a condenser of a refrigerant system, said receiver comprising a hollow body and a closure closing said body, said body defining an internal volume configured to receive a fluid flowing through said heat exchanger, said closure being adapted to establish a communication of said fluid between said internal volume and a flange of said heat exchanger, said closure being removable from said flange and detachably coupled to said body.

By providing a detachable closure to said receiver body, the receiver design is simplified. In deed, because such part does not need any more to resist to the mounting operations used in the prior art, like clinching, to assemble the bottom part of the receiver to its body, it is not necessary to have components provided with a massive design. Moreover, by having a less massive component, more design flexibility can be given to the closure, especially as weight and/or assembling operations direction are concerned.

According to further features of the invention which can be used together or separately:
said closure and said body are provided with a thread to be screwed to each other,
said receiver further comprises a fixing ring in order to detachably couple said closure to said body,
said closure is in plastic,
said closure comprises one or more channels for said communication of fluid between said internal volume and said flange,
said closure comprises a coupling zone detachably coupled to said body and a planar frame extending from said coupling zone,
said channels protrudes from said planar frame,
said closure is provided with an interface wall, configured to be in contact with said flange,
said interface wall is designed as a rib of said planar frame,
said closure comprises reinforcing ribs provided on said planar frame,
said closure is configured to be attached to said flange by a bolt,
said closure is provided with a through hole provided for a passage of the bolt,
said closure is provided with a sheath located between said interface plane and one of said reinforcing rib, said interface plane and said rib being provided with a hole in communication with said sheath for the passage of said bolt,
said body extends along an axial direction and said closure is adapted so that said flange is offset from said hollow body along said axial direction,
said closure comprises a fluid inlet connection and/or a fluid outlet connection configured to be coupled to said flange,
said inlet connection and/or said outlet connection is oriented perpendicularly to said hollow body axial direction,
said closure comprises an inlet connection pin and an outlet connection pin to establish a communication between said closure and said flange for said fluid,
said closure is configured so that said pins and bolt are parallel to each other,
said receiver comprises a filter for said fluid, located in said internal volume,
said filter comprises a chamber in fluid communication with said internal volume through a filtering media,
said filter further comprises a port establishing a fluid communication between said closure and said chamber and a by-pass establishing a communication between said internal volume and said closure,
said by-pass extends through said chamber,
said closure comprises one housing in which said filter is partially arranged.

The invention also relates to a heat exchanger, especially a condenser comprising a receiver as described above.

The flange is provided with one or several passages to establish a communication for said fluid toward said receiver.

The present invention will be described more specifically with reference to the following drawings.

DETAILED DESCRIPTION

In the following description, same numerical references are used to designate same elements.

Figure 1:
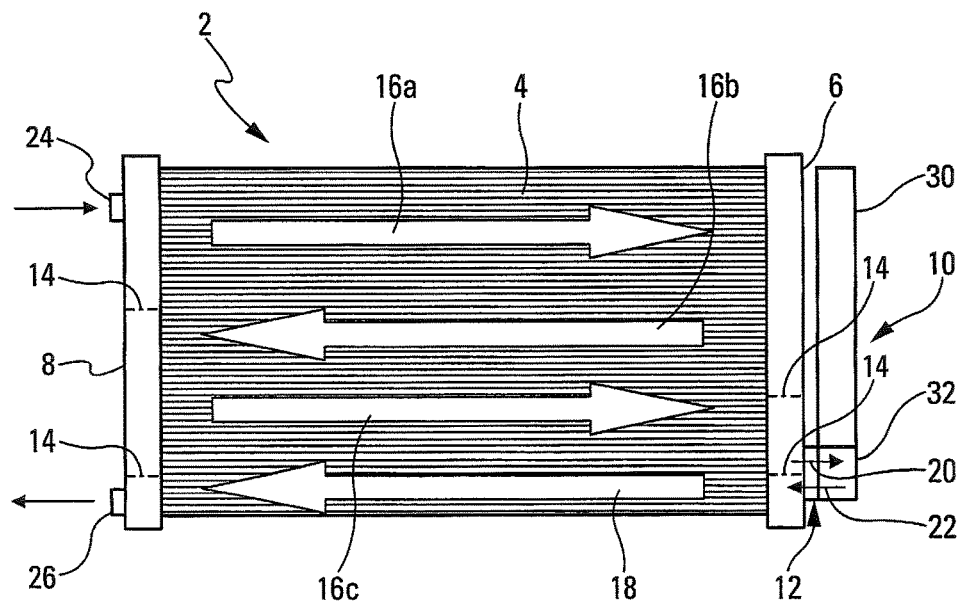
FIG. 1 is an elevation view showing schematically a condenser according to the invention.

As shown on FIG. 1, the invention relates to a heat exchanger, especially a condenser. The heat exchanger comprises a core 2 which is configured to enable a heat exchange between a first fluid flowing in said core 2 and a second fluid flowing through said core 2. The core 2 is here made of a plurality of parallel tubes 4 configured to form a circuit for the first fluid, and which are spaced between them to allow the flow of the second fluid. Said tubes 4 are held at their both ends by manifolds 6, 8 in which the first fluid coming from or going into the tubes 4 flows.

The tubes 4 are made for instance of aluminum and/or aluminum alloy. They are advantageously flat tubes having two opposite parallel flat faces laterally linked by radius. The tubes 4 can be multi-channel tubes. They are for instance extruded tubes. In another embodiment they are folded tubes internally equipped with an internal fin separating the channels. External fins, not shown, can be provided between the tubes 4 to enhance heat exchange with the second fluid.

The manifolds 6, 8 can comprise a collecting plate and a cover, not detailed on the drawings. The collecting plate comprises slits in which the extremities of the tubes are inserted. The cover closes the volume of the manifold 6, 8 in which the first fluid flows, together with baffles located at each of their longitudinal ends.

In case of applications as condenser, the first fluid flowing in the tubes is a refrigerant and the second fluid flowing between them is ambient air. According to another embodiment, the second fluid can be a coolant, such as a fluid including water. The condenser transforms the gas coming from a compressor into liquid along the circuit.

The core may be obtained by brazing which consists in heating up a preassembly of the heat exchanger components, to a molten temperature of a provision metal. The components fixation is fulfilled by capillarity diffusion on the components surface of the provision metal.

The heat exchanger according to the invention further comprises a receiver 10. Said receiver 10 is in fluid communication with said core 2 through a flange or socket 12, as far as the first fluid is concerned. The receiver 10 advantageously defines a reserve of first fluid. It can also be configured to remove moisture and/or impurities from the first fluid. In case of applications as condenser it can improves condensing efficiency through gas-liquid separation.

The receiver 10 is here located along a first 6 of said headers 6, 8. The flange 12 extends transversally from said header 6. It is provided with one or several internal passages to establish the communication for said first fluid between the core 2 and said receiver 10. Said flange 12 is advantageously brazed to the first header 6.

The core 2 may have multiple passes to let the first fluid flowing in a serpentine way from one header 6, 8 to the other. In that view, the headers may comprise further baffles 14 located internally.

In case of applications as condenser, the core 2 may especially comprise a first zone with one or several passes, here three passes 16a, 16b, 16c, dedicated to gas/liquid transformation of the first fluid upstream the receiver 10 and a second zone with at least one pass 18 dedicated to a subcooling of the first fluid downstream the receiver 10. In other words, in such case, the first fluid enters the receiver 10 from said first header 6, as shown by 20 and exits the receiver 10 toward said first header 6 as shown by 22. The flange 12 is then advantageously provided with two channels, one inlet channel to let the first fluid entering the receiver 10 from said first header 6 and another channel to let the first fluid exiting the receiver 10 toward said first header 6.

The illustrated embodiments correspond to the case mentioned above. Nevertheless, the invention also encompasses the case, not shown, where the receiver 10 comprises an outlet configured to communicate externally with a hose of a first fluid loop while its inlet only is in communication with said flange 12.

The core 2 may further comprise a first fluid inlet 24 and/or first fluid outlets 26. It may also comprise brackets not shown configured to attach the exchanger on a support.

As illustrated, the core 2 is advantageously configured to have the first fluid flowing from the top to the bottom.

Figure 2:
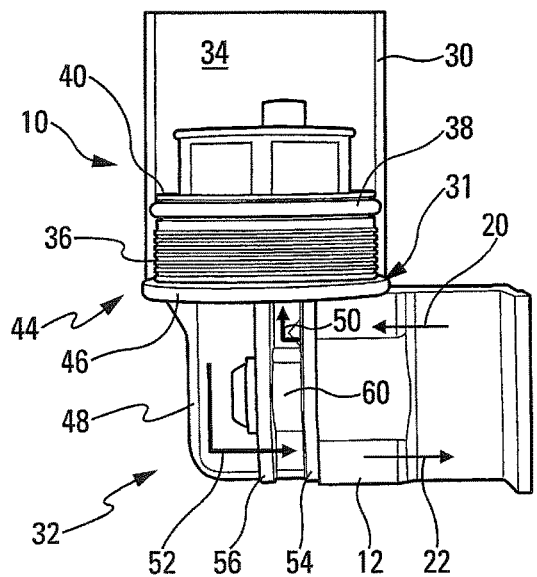
FIG. 2 is a side view showing a flange and a bottom part of a receiver of a first embodiment of the invention.

As can be better seen on FIG. 2, said receiver 10 comprises a hollow body 30 and a closure 32 closing said body. Said body 30 defines an internal volume 34 configured to receive said first fluid. Said closure 32 is adapted to establish a communication of said first fluid between said internal volume 34 and said flange 12.

Said hollow body 30 is advantageously made of a tube comprising a closed extremity here on top and an open extremity here on bottom. It may be made by die casting and/or deep drawing. Said body 30 is for instance of circular section. It comprises an opening 31 at its open extremity, said opening 31 being closed by said closure 32.

Advantageously, said body 30 extends along an axial direction and said closure 32 is adapted so that said flange 12 is offset from said hollow body 30 along said axial direction. In other word, said closure 32 extends in the longitudinal prolongation of said hollow body 30.

Figure 3:
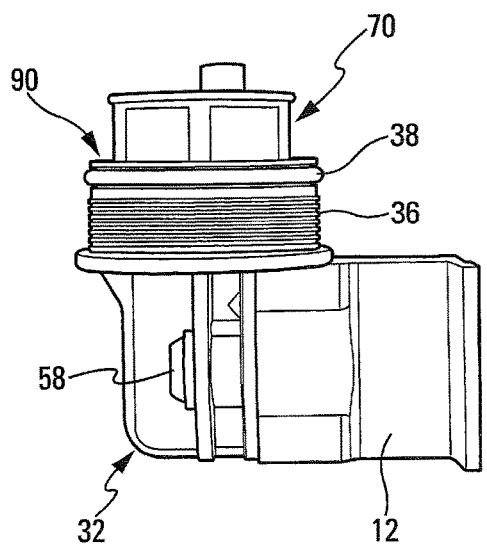
FIG. 3 is a side view showing the flange and a closure of the receiver of FIG. 2.
Figure 4:
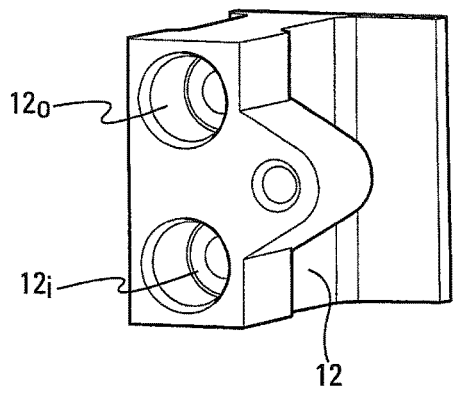
FIG. 4 is perspective view of the flange of FIGS. 2 and 3.
Figure 5:
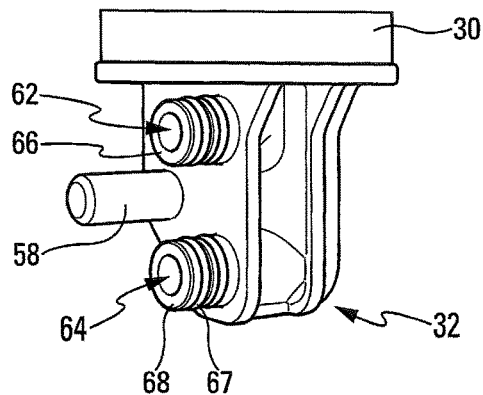
FIG. 5 is perspective view of the bottom part of the receiver of FIG. 2.

According to the invention, said closure 32 is removable from said flange 12 and detachably coupled to said body 30. FIG. 5 shows the receiver 10 detached from said flange 12, said flange being represented on FIG. 6 without the receiver 10. By the way, on FIG. 6, the internal passages 12i, 12o provided in the flange 12 to establish the communication for said first fluid between the core 2 and said receiver 10 can be seen. FIG. 3 shows said closure 12 detached from said body 30. In this figure the closure 32 is attached to the flange 12. Nevertheless, the receiver 10 aims at being assembled before being attached to the first header 6. In other words, the hollow body 10 and the closure 12 aim at being preassembled to form the receiver 7, as shown in FIG. 5, before being mounted on the flange 12.

As illustrated by the embodiments of FIGS. 2 to 5 and 7, said closure 32 and said body 30 are provided with a thread 36 to be screwed to each other. A first thread, not visible, is provided on an internal surface of the body 30 here in an area closed to its opening 31. A corresponding thread 36 is located on an external wall of the closure 32. One or more sealing gaskets 38 are also provided, here only one. It is located between the internal surface of the body 30 and the external surface of the closure 32. Said gasket is here situated between the closure thread 36 and a distal edge 40 of said closure 32.

Figure 6:
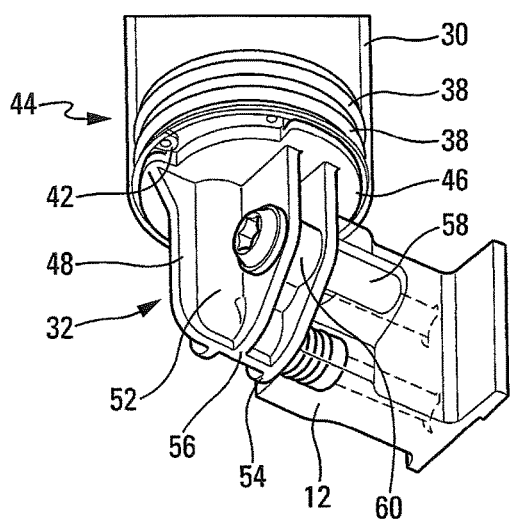
FIG. 6 is a perspective view of the flange and the bottom part of a second embodiment of the invention.
Figure 7:
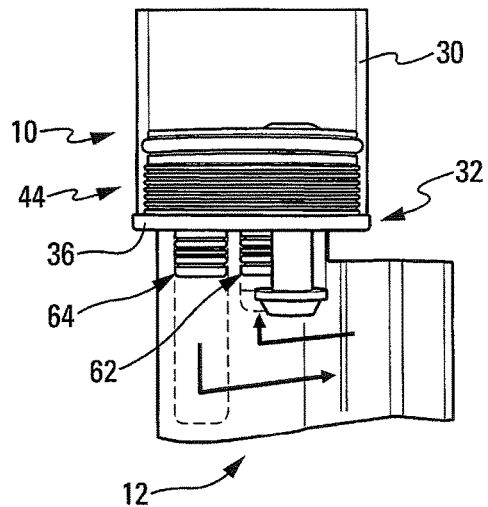
FIG. 7 is a perspective view of the flange and the bottom part of a third embodiment of the invention.

In a further embodiment corresponding to FIG. 6, said receiver 10 further comprises a fixing ring 42, as a Seger ring, in order to detachably couple said closure 32 to said body 30. The hollow body 30 comprises an internal groove and the closure 32 comprises a corresponding external groove. To mount the closure 32 on the hollow body 30, said ring 42 is first compressed in said closure external groove, said closure 32 is then inserted in said hollow body 30 while the ring is still compressed and, once said closure 32 is in place in said body 30, the ring 42 is released to extend in a radial way in both grooves. One or more sealing gasket 38 are also provided, here two. They are located between the internal surface of the body 30 and the external surface of the closure 32. They are spaced from each other along the longitudinal axis of the hollow body 30.

Thanks to such kind of mechanical connections, the clinching operations used according to state of the art to assemble the upper and lower parts of a receiver can be avoided which offers great design opportunities, especially regarding the closure 32 as it does not need to be as massive as the prior art receiver lower part.

For instance, it will be possible to have closures 12 made of plastic. It will hence give the possibility to obtain the closure 12 by molding. The manufacturing costs and the weight of the receiver can thus be decreased. Yet, the closure may also be made of metal, especially aluminum, as the above mentioned advantages can also be met because the quantity of material to be used decreases.

Said closure 32 comprises a coupling zone 44 detachably coupled to said body 30. Said coupling zone 44 comprises here a closure base plate 46 on which said hollow body 30 abuts.

Going back to the embodiment of FIGS. 2 to 5 and 6, said closure further comprises a planar frame 48 extending from said coupling zone 44, especially said closure base plate 46. Said closure 32 comprises one or more channels 50, 52 for said communication of fluid between said internal volume 34 and said flange 12. It here comprises one inlet channel 50 and one outlet channel 52. Said channels 50, 52 protrude from said planar frame 48, especially on each side thereof. Both of them are L shaped.

Said closure 32 is provided with an interface wall 54, configured to be in contact with said flange 12. Said interface wall 54 is here designed as a rib of said planar frame 48. Said closure 32 may further comprise reinforcing ribs 56 provided on said planar frame 48.

Said closure 32 is advantageously configured to be attached to said flange 12 by a bolt or screw 58. Said closure 32 is here provided in that view with a through hole defining a passage for the bolt 58. Said closure 32 is for instance provided with a sheath 60 located between said interface wall 54 and one of said reinforcing rib 56. Said interface wall 54 and said rib 56 are provided with a hole in communication with said sheath 60 for the passage of said bolt 58.

As can be better seen on FIG. 5, said closure comprises a fluid inlet connection 62 and/or a fluid outlet connection 64 configured to be coupled to said flange 10.

In the first and second embodiment, said inlet connection 62 and/or said outlet connection 64 are oriented perpendicularly to said hollow body 30 axial direction. It may simplify the assembly of the receiver 10 on the flange 12 in a first kind of environment.

In the third embodiment, said inlet connection 62 and/or said outlet connection 64 are oriented axially which may simplify the assembly of the receiver 10 on the flange 12 in another kind of environment.

In all the illustrated embodiments, said closure 32 comprises an inlet connection pin 66 and an outlet connection pin 68 to establish a communication between said closure and said flange for said first fluid. In other words, the male part of the first fluid connection is located on said closure 32 for both inlet and outlet, the female part being located on the flange 12. Other solutions are possible without departing from the invention. Said pin 66, 68 may be provided with one or more sealing gaskets 67.

Said closure 32 is advantageously configured so that said pins 66, 68 and bolt 58 are parallel to each other.

Said receiver may further comprise a filter 70 for said fluid, located in said internal volume 34.

Figure 8:
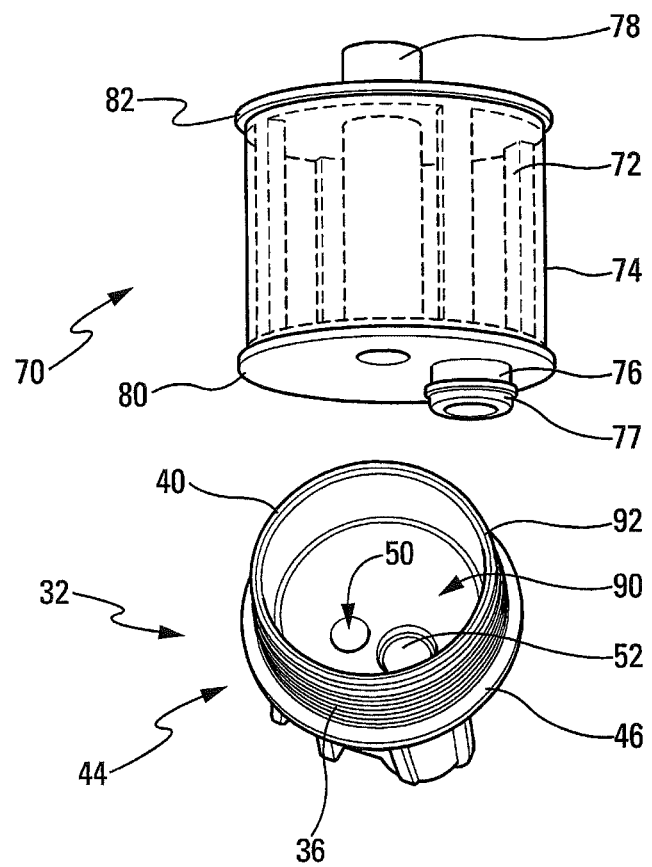
FIG. 8 is an exploded view showing in perspective the closure and a filter of a receiver according to the invention.

As better illustrated on FIG. 8, said filter 70 comprises a chamber 72 in fluid communication with said internal volume 34 through a filtering media 74. The first fluid can thus flow between the chamber 72 and said internal volume through said filtering media.

Said filter 70 further comprises a port 76 establishing a fluid communication between said closure 32 and said chamber 72. A gasket 77 may be provided on said port. Said filter 70 also comprise a by-pass 78 establishing a communication between said internal volume 34 and said closure 32, as far as the first fluid is concerned.

Here said by-pass 78 extends axially through said chamber 72. The latter is for instance cylindrical and said by-pass 78 is located along a longitudinal axe of said chamber 72. Said filtering media 74 is located coaxially with said by-pass 78.

Said filter 70 comprises two side walls 80, 82 between which said filtering media 74 and by pass 78 extend. Said port 76 protrudes from one 80 of said side walls in direction of said closure 32. Said by pass 78 protrudes from the other 82 of said side walls in the opposite direction.

Said closure 32 comprises one housing 90 in which said filter 70 is partially arranged. Said closure 32 comprises a wall 92 defining said housing 90. Said wall especially defines said external surface bearing said closure thread 36 and said closure distal edge 40. Said wall 92 extends here from said closure base plate 46 on which said hollow body 30 abuts. Said housing is located in said coupling zone 44. Said closure distal edge 40 is located opposite said closure base plate 46.

The receiver 10 may further comprise a desiccant bag, not shown, especially located in said internal volume 34.

The circulation of the first fluid in the receiver will now be described. It enters the inlet channel 50 coming from the outlet passage 12o of the flange 12 through the receiver inlet connection 62. It flows through said closure inlet channel 50 to said filter by pass 78 from which it enters said internal volume 34. It flows then through said filtering media 74 to enter said filter chamber 72 from which it exits through said filter port 76. To finish with it flows through said closure outlet channel 52 to said receiver outlet connection 64 to enter the inlet passage 12*i* of the flange 12.

What is claimed:

1. A receiver for a heat exchanger that is a condenser of a refrigerant system, said receiver comprising:
    a hollow body;
    a closure closing said body, said body defining an internal volume configured to receive a fluid flowing through said heat exchanger,
    said closure being adapted to establish a communication of said fluid between said internal volume and a flange of said heat exchanger, and said closure being removable from said flange and detachably coupled to said body; and
    a filter for said fluid, located in said internal volume, said filter comprising:
        a chamber in fluid communication with said internal volume via a filtering media,
        a port establishing fluid communication between said closure and said chamber, and
        a by-pass establishing a communication between said internal volume and said closure,
    wherein said by-pass is a fluid inlet to said internal volume and said port is a fluid outlet of said internal volume, wherein the by-pass allows said fluid to travel directly from said closure to said internal volume,
    wherein said closure is provided with an interface wall, configured to be in contact with said flange, said interface wall being a rib of a planar frame, wherein said closure further comprises reinforcing ribs provided on said planar frame, and wherein a sheath is located between said interface wall and one of said reinforcing ribs, wherein the sheath is a passage for a bolt to attach said closure to said flange.

2. The receiver according to claim 1, wherein said closure and said body are provided with a thread to be screwed to each other.

3. The receiver according to claim 1, further comprising a fixing ring configured to detachably couple said closure to said body.

4. The receiver according to claim 1, wherein said closure is in plastic.

5. The receiver according to claim 1, wherein said closure comprises a coupling zone detachably coupled to said body and a planar frame extending from said coupling zone, said closure comprising one or more channels for said communication of fluid between said internal volume and said flange, said channels protruding from said planar frame.

6. The receiver according to claim 1, wherein said body extends along an axial direction and said closure is adapted so that said flange is offset from said hollow body along said axial direction.

7. The receiver according to claim 6, wherein said closure comprises a fluid inlet connection and/or a fluid outlet connection configured to be coupled to said flange, said inlet connection and/or said outlet connection being oriented perpendicularly to said hollow body axial direction.

8. The receiver according to claim 1, wherein said closure comprises an inlet connection pin and an outlet connection pin to establish a communication between said closure and said flange for said fluid.

9. The receiver according to claim 1, wherein said filter media is located coaxially with said by-pass.

10. The receiver according to claim 1, wherein said by-pass extends through said chamber.

11. The receiver according to claim 1, wherein said closure comprises a housing in which said filter is partially arranged.

12. A heat exchanger comprising a receiver according to claim 1.

13. The heat exchanger of claim 12, wherein the heat exchanger is a condenser of a refrigerant system.

* * * * *